United States Patent
Yee

[19]

[11] Patent Number: 6,160,355

[45] Date of Patent: Dec. 12, 2000

[54] LAMP CONTROL CIRCUIT

[76] Inventor: Vincent M. Yee, 14122 D. Marquessas Way, Marina del Rey, Calif. 90292

[21] Appl. No.: 09/096,935

[22] Filed: Jun. 12, 1998

[51] Int. Cl.[7] .................................................. H05B 37/00
[52] U.S. Cl. ....................... 315/200 A; 315/129; 315/224
[58] Field of Search .......................... 315/200 A, DIG. 4, 315/307, 241 S, 224, 129, 133, DIG. 7; 307/66

[56] References Cited

U.S. PATENT DOCUMENTS

| | | | |
|---|---|---|---|
| 5,124,508 | 6/1992 | Dubrueq ................................. | 174/260 |
| 5,412,548 | 5/1995 | Yee ......................................... | 362/202 |
| 5,498,934 | 3/1996 | Nilssen .................................... | 315/224 |
| 5,561,351 | 10/1996 | Vrionis et al. .......................... | 315/248 |
| 5,585,699 | 12/1996 | Schulz .................................... | 315/293 |
| 5,588,739 | 12/1996 | Nakao .................................... | 362/205 |
| 5,648,702 | 7/1997 | Choi et al. .............................. | 315/224 |
| 5,821,697 | 10/1998 | Weber ..................................... | 315/200 |

*Primary Examiner*—Don Wong
*Assistant Examiner*—Tuyet T. Vo
*Attorney, Agent, or Firm*—Marvin H. Kleinberg; Marshall A. Lerner; Michael Hurey

[57] ABSTRACT

A lamp control circuit for use in a flashlight having a power supply and a light bulb. The lamp control circuit includes oscillator means selectively applying power to the light bulb for turning the bulb on and off at one of a plurality of a selectable frequencies, voltage indicator means coupled to the power supply for indicating to a user when the voltage level of the power supply falls below a pre-determined level and dimmer means coupled between the light bulb and the power supply for reducing the amount of electrical current supplied to the light bulb. The control circuit is mounted on a circuit board which is configured to indicate to the circuit the number and voltage of the batteries which are used to power the flashlight. An alternative embodiment may also include a light emitting diode for use when the battery voltage is insufficient to meet the threshold voltage of the bulb.

36 Claims, 8 Drawing Sheets

62

LAMP CONTROL CIRCUIT

BACKGROUND OF THE INVENTION

1. Field of the Invention

This invention relates to battery powered electrical lamps and more particularly, a lamp control circuit for use with a battery operated flashlight.

2. Description of the Related Art

Flashlights of the prior art have, for the most part, included simple flashing circuits for use in emergency or warning situations. These circuits generally were of the relaxation oscillator type and provided little or no flexibility in a choice of flashing patterns, frequency of flash or duration of the flash.

Other problems of prior art flashlight circuits has been the need to provide bulbs that are specific to the type of battery that is to be used. For example, different bulbs are required for AAA cells, AA cells, C cells and D cells. Each imposes different requirements on the bulbs to be used and the flashing circuits which can be implemented.

SUMMARY OF THE INVENTION

According to the present invention, a set of logic circuits are combined with appropriate amplifier circuits so that a flashlight can exhibit a variety of selectable flashing patterns of variable intensity. Moreover, the novel circuits of the present invention include the ability to work with different sizes and numbers of flashlight cells.

The chip which contains the circuits includes a voltage regulator which limits the maximum voltage across the bulb to the maximum voltage tolerance of the bulb, using a current source and a series resistance, irrespective of the available voltage from the power supply or battery, with a maximum of 6.0 v, by setting the current flow through the bulb to the optimum level (I=V/R).

Hence, the same bulb can be used for C and D cells regardless of the number of batteries and the same bulb can be used for the AA and AAA cells regardless of the number of batteries. A multiplexer sets the proper voltage for the regulator so as to set the proper current for either the C cell and D cell option which may use from 2 to 4 cells, or the AA cell and AAA cell option, which may use from 1 to 4 cells.

The board design determines which application the chip is to be used for. Therefore, the same chip can be used in all cases regardless of cell size or number. However, the bulbs for C and D cells cannot be used for AA and AAA cells, and vice versa. However, the same chip could be used for all battery sizes (AAA, AA, C or D) if the bulb is specially designed for such service.

The chip size will meet the specifications for the maximum geometric allowance of the AA size miniature flashlight (2.3 mm×2.3 mm die size, 4.5 mm×4.5 mm for chip size).

The power is calculated as the available voltage multiplied by the circuit current (V×I). The voltage regulator keeps the current the same for a given voltage. The voltage is determined by the number of batteries; hence, the power is directly proportional to the number of batteries.

The board is an integral part of the chip. How the board is configured will determine how the chip is used. Hence, there is no need for an external switch.

If the voltage falls below 80% of the steady state value of the battery life curve, low battery indicator circuitry oscillates and flashes the bulb at 6 times the designed Frequency 3 (6×1 Hz). Variations in the CMOS process, voltage and current levels (based on the tolerance and error levels of the battery) will cause a variation in the actual frequency of oscillation. The low battery flash interval can vary from 6 Hz by a percentage error which is generally undetectable to the human eye.

A dimming capacity is provided as option for the user to decrease the visual intensity registered by the human eye by 50% (proportional relationship). This may be implemented in one of two ways:

a) A percentage of current is steered from the bulb using a differential pair. When the dimming circuitry is turned on, it supplies half of the current required by circuit, thereby decreasing the amount of current flowing though the bulb by 50%;

b) A multiplexer switch electrically connected to a user switch allows the user to select the dim feature. This is implemented by using another multiplexer switch which causes the voltage regulator to decrease the bulb current by 50%. This yields a 50% conservation of power from the circuit. When the multiplexer is set to normal, the normal current is applied to the bulb; however, at the dimming setting, the voltage regulator sets the bulb current at 50% of normal, thereby decreasing the bulb intensity by 50%.

For a flashing or blinking operation, the available frequency range is ½ Hz, 1 Hz, 2 Hz, or 4 Hz. However, only one of the frequencies can be selected for a given installation. The oscillator is designed to minimize power usage during flash mode. The RMS average will be lower than the average power output of the "on" mode.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 8, including

DETAILED DESCRIPTION OF THE PREFERRED EMBODIMENT

Figure 1:
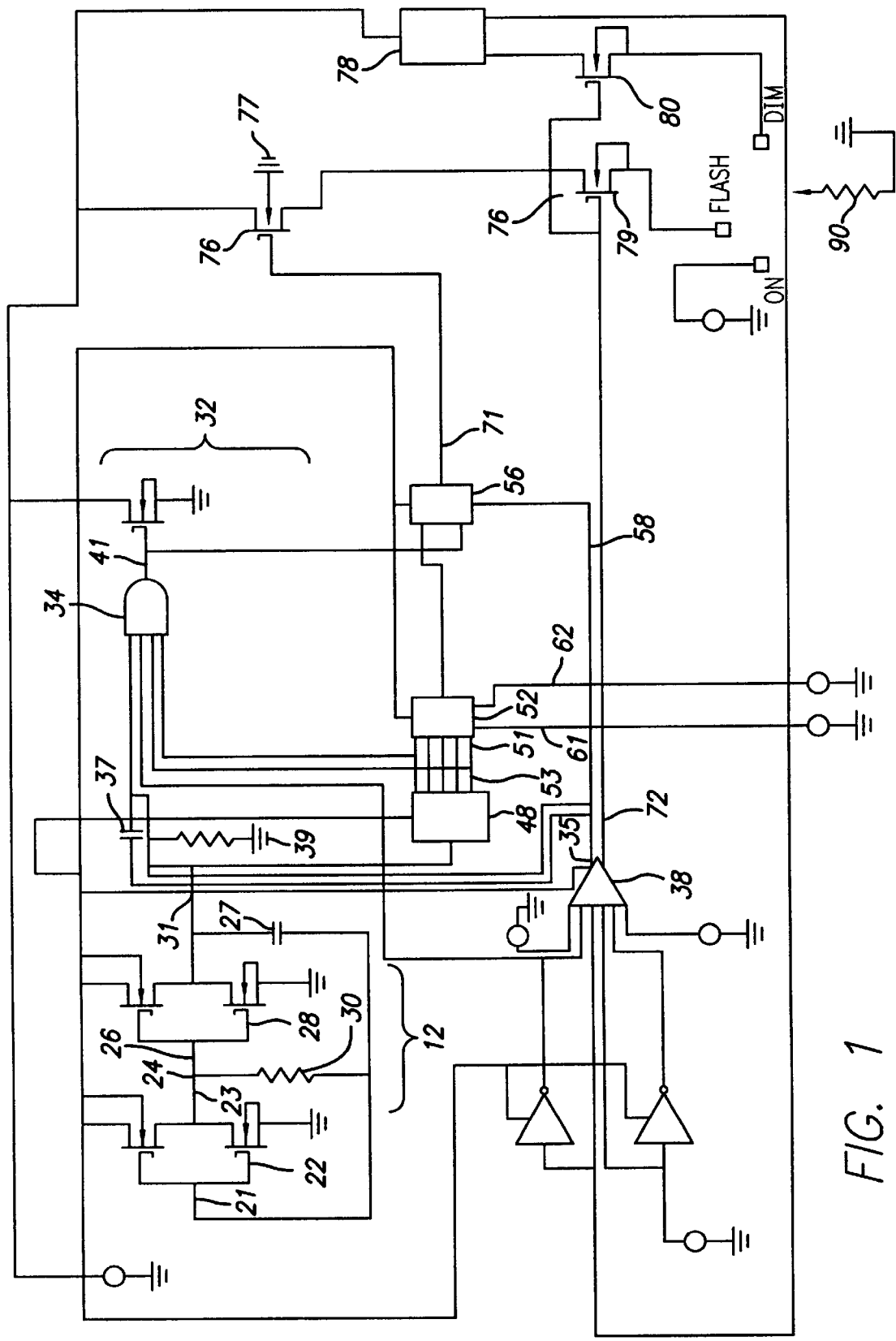
FIG. 1 is a schematic diagram of the overall circuit configuration according to the present invention.

A lamp control circuit will be described. In the following description, for the purposes of explanation, specific construction details, circuit arrangements, and component descriptions are set forth in order to provide a more thorough understanding of the present invention. It will be apparent to those skilled in the art, however, that the present invention may be practiced without these specific details. In other instances, well known circuits, components and structures have not been described in detail so as not to obscure the present invention unnecessarily.

The lamp control circuit of the present invention is intended to be used in the preferred embodiment in connection with a portable flashlight. Examples of such flashlights can be found in U.S. Pat. No. 5,412,548 issued to Yee and 5,588,739 issued to Nakao, the contents of which are incorporated herein by this reference.

The physical structure of the flashlight is not illustrated in the drawings because its structure is well known in the art, and the flashlight itself is not an element of the present invention. Throughout the following description reference may be made to common elements of a flashlight, such as a housing and a light bulb which are used in the flashlight. It will be apparent to those skilled in the art, however, that the lamp control circuit of the present invention may be used in connection with other devices or components where a light bulb provides illumination, and the present invention is to be understood to not be limited to use only with a flashlight. In the following, a description of the various components and circuits of the lamp control circuit will first be given. A description of the operation of the overall circuit will then be provided.

Referring first to FIG. 1, a general block diagram of the overall circuit configuration of the present invention is illustrated. In the preferred embodiment, the elements of the control circuit are located on a single integrated circuit chip. The elements of the control circuit are illustrated in FIG. 1. This integrated circuit is mounted on a circuit board, which is described in more detail with reference to FIG. 8 below. The physical dimensions of the integrated circuit chip can vary according to the specific application in which it is used. In the preferred embodiment, the chip will meet industry-standard specifications for the AA size Duolite. These specifications will be well known to those having skill in the art. In particular, the integrated circuit will, in the preferred embodiment, have maximum geometric dimensions of 2.3 millimeter square die size, and a 4.5 millimeter square chip size. These exact measurements may vary depending on the specific application in which the chip is employed.

Referring again to FIG. 1, the major elements of the preferred embodiment of the control circuit will now be described. The control circuit includes an oscillator circuit 12. The oscillator circuit illustrated in FIG. 1 was chosen for the preferred embodiment of the invention because of its simple nature and robust design. The oscillator includes a first inverter 22. The output 23 of the first inverter 22 is coupled to node 24, which in turn is coupled to the input 26 of a second inverter 28 and a resistor 30. When the input 21 to first inverter 22 is high, the output 23 of the inverter is low. Consequently, the output of the second inverter 28 is high.

The capacitor 27 charges to a high state when output 31 of the second inverter is high. The capacitance value of the capacitor is designated by C. After charging, the capacitor 27 discharges through the resistor 30. The resistance value of the resistor is denoted by R. The capacitor discharges at a time constant equal to RC. This cause the input of the first inverter to change state to low. The frequency of the oscillation is given as 1/RC. The oscillator frequency was chosen in the preferred embodiment to be approximately 25 MHz. This frequency has been found to provide reliable operation of the circuit.

Referring again to FIG. 1, the output 31 of the oscillator circuit 12 is coupled to the frequency divider chain 48. The frequency divider chain is illustrated in more detail in FIG. 2. This element of the present invention divides the output frequency of the oscillator circuit 12 into four distinct frequencies. In the preferred embodiment, the output frequencies of the frequency divider are 4 Hz, 2 Hz, 1 Hz and ½ Hz. It will be apparent to those skilled in the art, however, that a greater or lesser number of output signals may be employed. In addition, the specific frequency values for the output may vary according to the specific needs or application of the control circuit.

Figure 2:
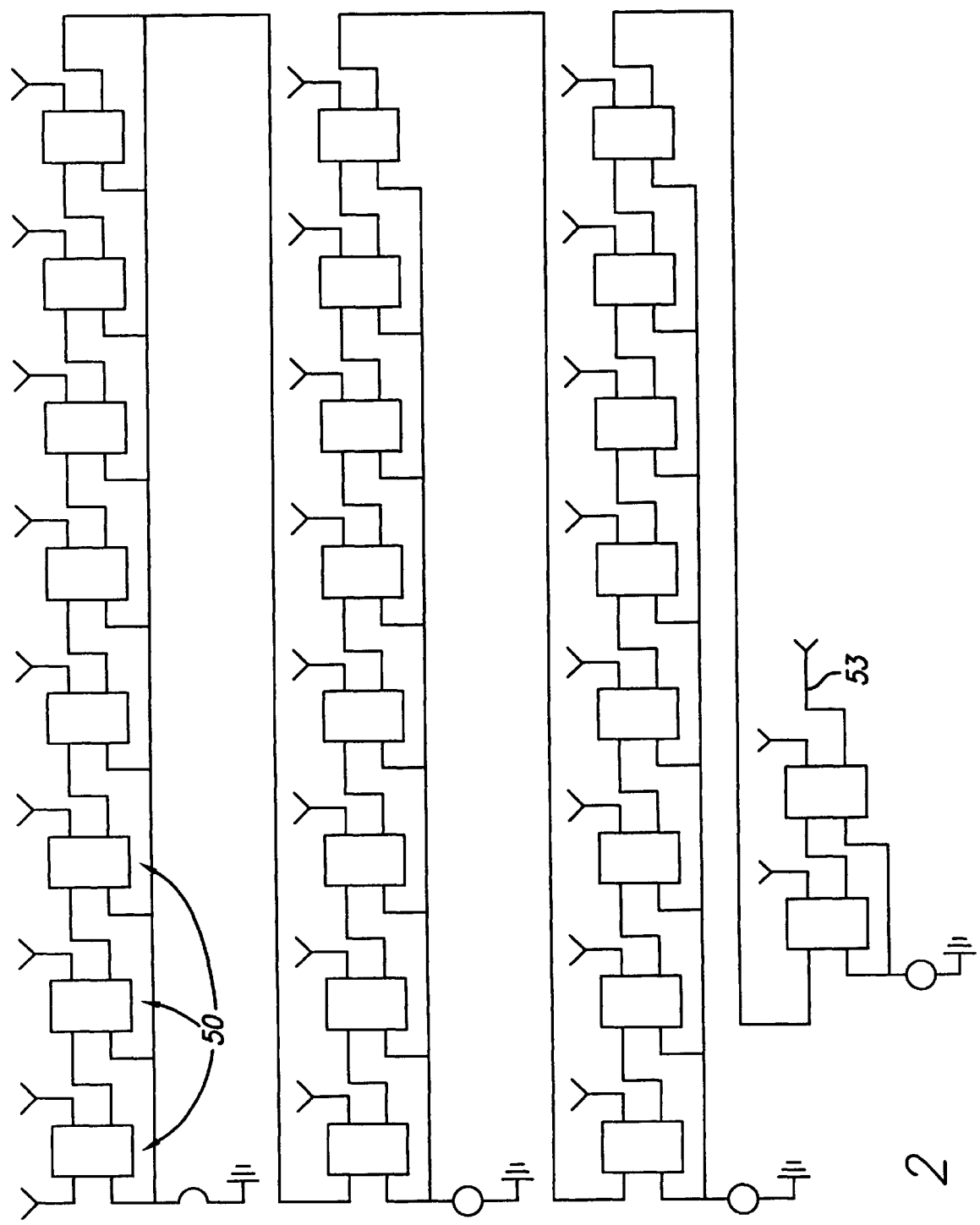
FIG. 2 is a circuit diagram of a frequency divider chain used in the circuits of the present invention.
Figure 4:
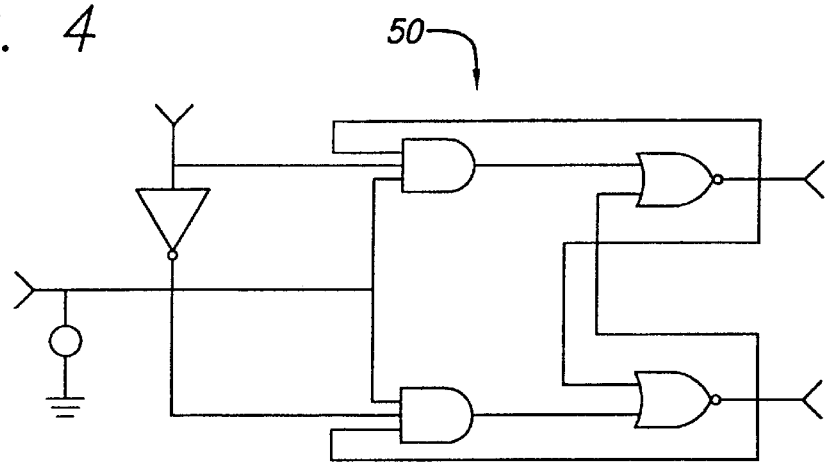
FIG. 4 is a circuit diagram of a frequency divider circuit.

Referring next to FIG. 2, a more detailed illustration of the frequency divider circuit 48 is shown. The frequency divider circuit 48 accomplishes its function by means of a series of flip flops 50 configured as divide by two circuits. The specific structure of the flip flops is illustrated in FIG. 4, and will be familiar to those skilled in the art.

Figure 5:
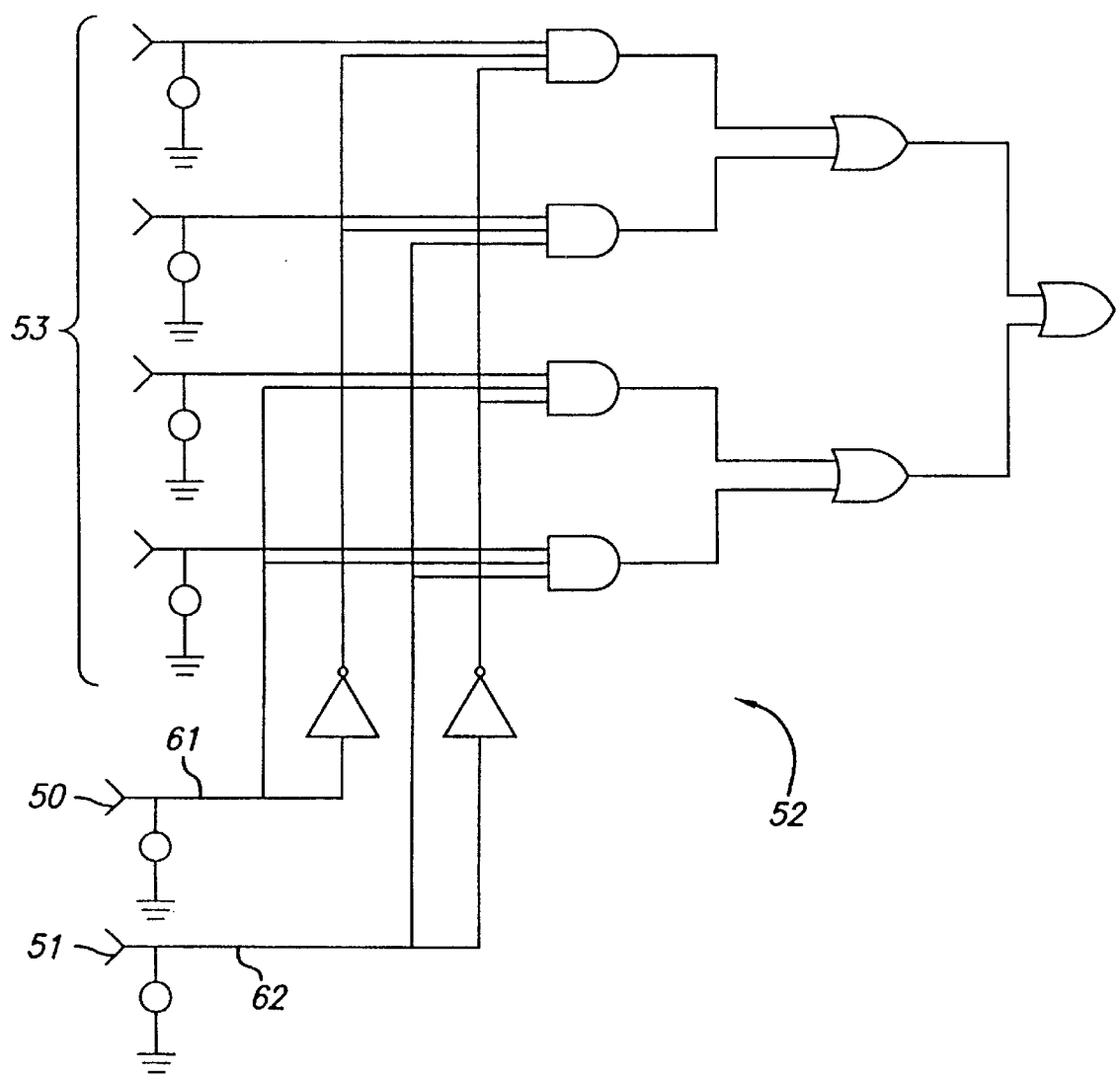
FIG. 5 is a circuit diagram of a frequency selection circuit.

The output of the frequency divider circuit 48 is made up of the four different frequency signals. The output signals are collectively referred to with reference numeral 53. This output 53 is coupled to the input 51 of the multiplexer 52. Multiplexer 52 is a 4 to 1 multiplexer which selects the frequency desired by the user. The structure of the multiplexer 52 is illustrated in FIG. 5. The output frequency of the multiplexer is chosen by means of inputs 61 and 62 to the multiplexer.

Input 61 is attached to a signal line which is given the designation S0. Input 62 is attached to a signal line which is given the designation S1. The output frequency of the multiplexer depends on the voltage levels of the inputs 61 and 62. In the preferred embodiment, the inputs 61 and 62 are fixed at either a high voltage level, or at ground. The specific values depend on the arrangement of the printed circuit board, which is discussed in more detail below with respect to FIG. 9.

One of the elements of the present invention is a low battery indicator circuit. The preferred embodiment of the present invention anticipates that batteries will be used as the power supply for the flashlight and the control circuit. These batteries will be used in various configurations to supply an appropriate voltage and current to the light bulb. The present invention includes a feature which will give an indication to a user when the batteries need to be replaced.

The low battery indicator circuit is illustrated in FIG. 1 and is generally denoted by reference numeral 32. The low battery indicator is generally composed of a four input AND gate 32. Two of the outputs from the frequency divider circuit 48 are coupled to the input of the AND gate 34. In the preferred embodiment, these two inputs are the 1 Hz and 2 Hz signals. A third input of the AND gate 34 is coupled to a signal from the voltage reference amplifier circuit 38. (The voltage reference amplifier is described in more detail below with respect to FIG. 3.) The fourth input signal to the AND gate 34 is coupled to capacitor 37.

Figure 3:
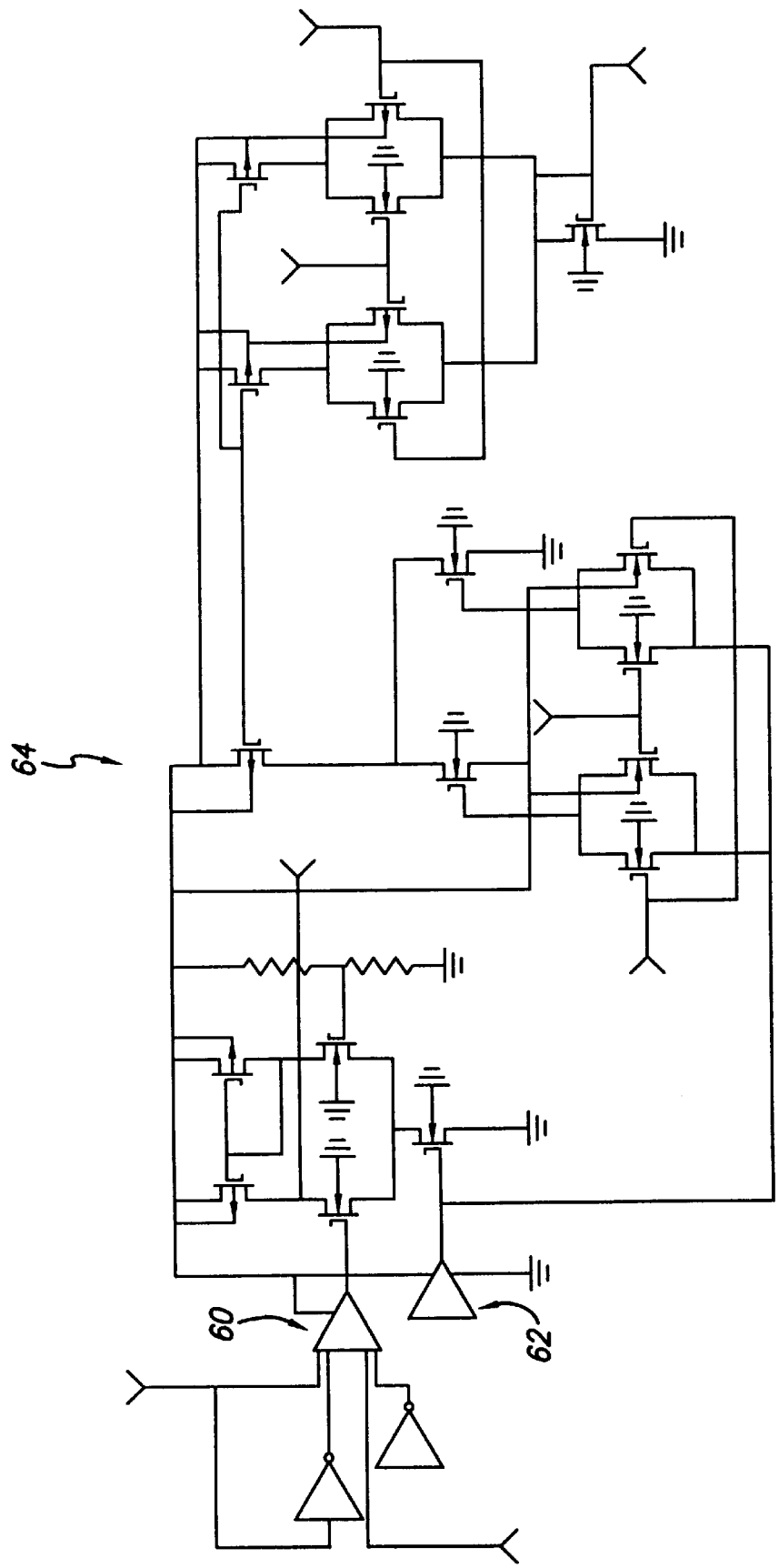
FIG. 3 is circuit diagram of a voltage regulating circuit according to the present invention.

Referring next to FIG. 3, the operation of the voltage reference amplifier circuit will be described. The voltage reference amplifier is composed of two bandgap amplifiers 60 and 62. These are coupled to a comparator circuit 64 which sends a signal to the 2 to 1 multiplexer to select the operation of the low battery indicator circuit.

Figure 6:
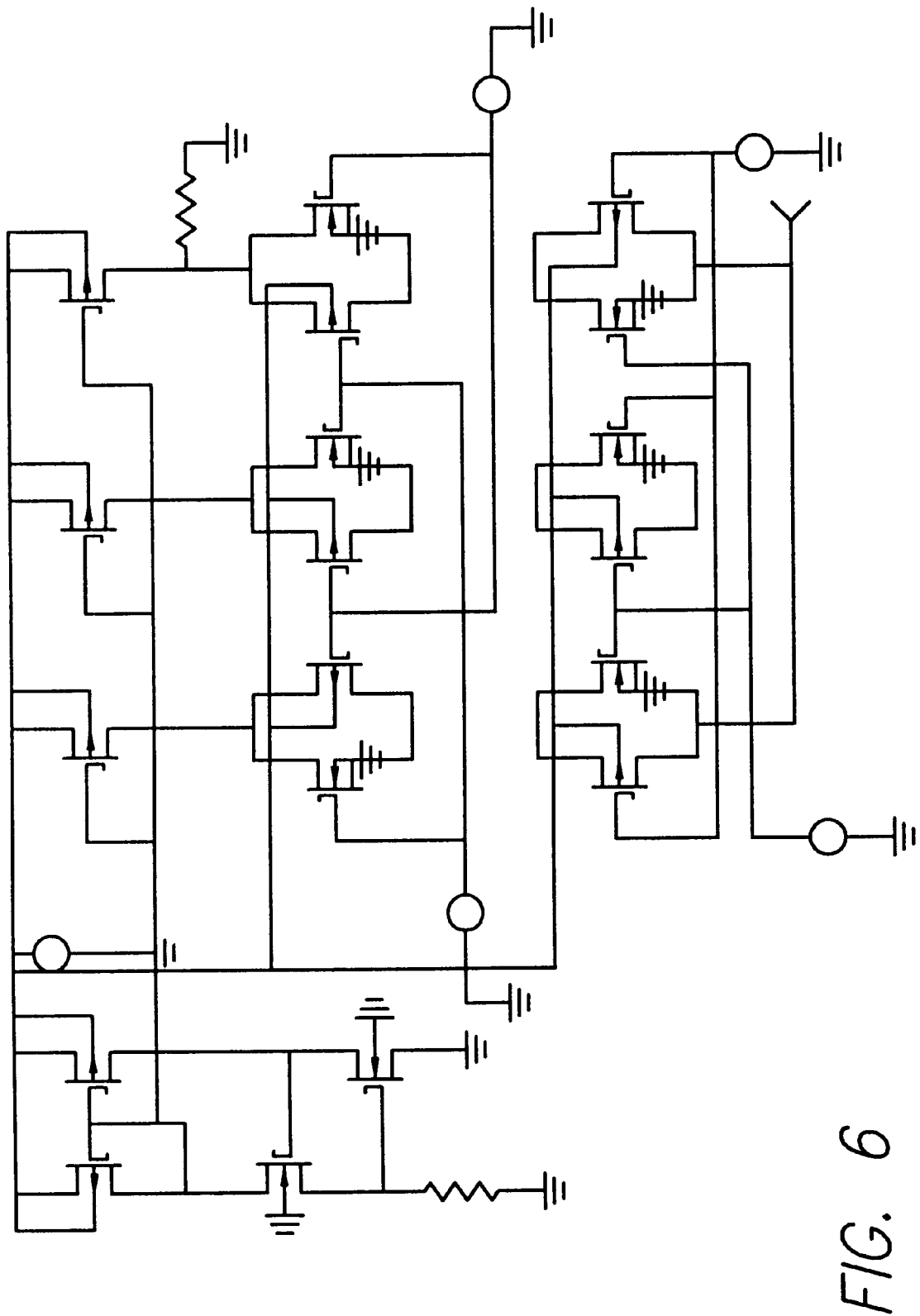
FIG. 6 is a circuit diagram of a band gap amplifier suitable for use in the present invention.
Figure 7:
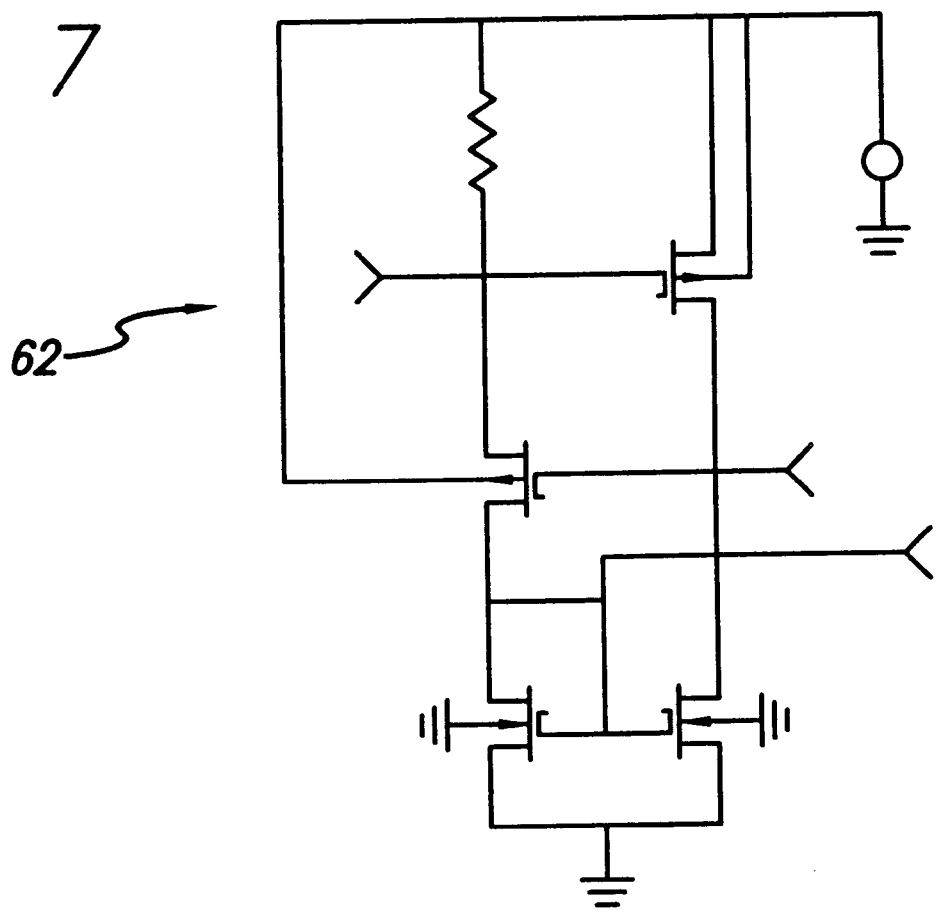
FIG. 7 is a circuit diagram of an alternative band gap amplifier suitable for use in the present invention.

Bandgap amplifier 60 sets the voltage needed for the comparator circuit. It is of a design which is well known in the art, and which uses the inherent properties of silicon to set a voltage independent of the voltage source. The preferred embodiment of the structure of this circuit is illustrated in FIG. 6.

Bandgap amplifier 62 sets the voltage used to determine the current for the circuit. It serves as a current mirror setting the current needed for the remainder of the circuit also independent of voltage source. The preferred embodiment of the structure of this circuit is illustrated in FIG. 6.

When the voltage level ($V_{cc}$) of the batteries drops below a pre-determined or specified level, an output 35 of the voltage reference amplifier circuit 35 goes high. The output 35 is attached to a signal line which is given the designation S5. When S5 goes high, this causes capacitor 37 to charge. The output of the capacitor 37 is attached to a signal line given the designation S5'. Signal line S5' is also driven high when capacitor 37 charges. The signal at the output 35 is high for a fixed period of time until the capacitor can discharge through resistor 39.

In the preferred embodiment, the pre-determined battery voltage level is set to be approximately 80% of the steady state value of the battery power supply. Thus, when the battery voltage level drops to approximately 80% of its steady state value, the low battery circuit is activated. It will be apparent to those skilled in the art, however, that the exact value of the power level at which the low battery circuit is activated, may vary from this specific amount, and still be within the overall spirit and scope of the present invention.

In the preferred embodiment the values for the capacitor 37 and resistor 39 are chosen such that the signal line S5' stays high for approximately six seconds until capacitor 37 discharges through resistor 39. It will be apparent to those skilled in the art that specific values for the capacitor 37 and the resistor 39 can be varied without departing from the spirit and scope of the present invention.

When a low battery level is indicated, the output 41 of the AND gate 34 will be forced to go high. This output signal is coupled to an input of multiplexer 56. This multiplexer interrupts the normal circuit operation when a low battery voltage situation is encountered. The multiplexer is activated when signal S5 from the output 35 of the voltage amplifier circuit 38 goes high. The output 71 of the multiplexer is used to vary the amount of electrical current to the light bulb.

The amount of current which is supplied to the light bulb 90 (which is illustrated in FIG. 1) is controlled by a field effect transistor (FET) pair 76. The input to the FET pair 76 is the output 71 of the two to one multiplexer 56. This signal is coupled to the first FET 77. The second FET is coupled to an output 72 of the voltage reference amplifier circuit 38. This output is also known as the current control level.

Indicator 78 is a differential pair which signals to the control circuit when a user has selected a "dim" feature for the light bulb. The output of the indicator 78 is coupled to a signal line which is given the designation S3. The signal line S3 is coupled to an input of the voltage reference amplifier circuit 38. The indicator 78 is also coupled to a parallel FET 80. The FET 80 is scaled to provide approximately 50% of the nominal current to the light bulb when it receives a signal from the indicator 78. This causes the bulb to dim, and preserves battery life.

Figure 8A:
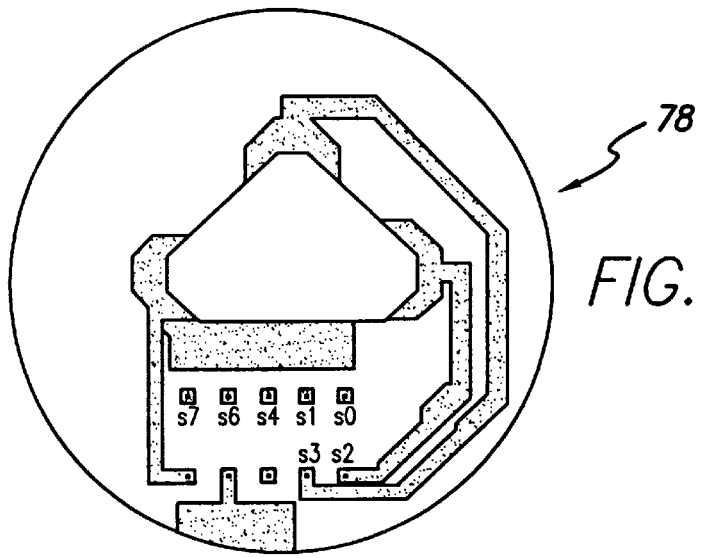
FIGS. 8A, 8B and 8C are alternative circuit board configurations useful in various embodiments of the present invention.
Figure 8B:
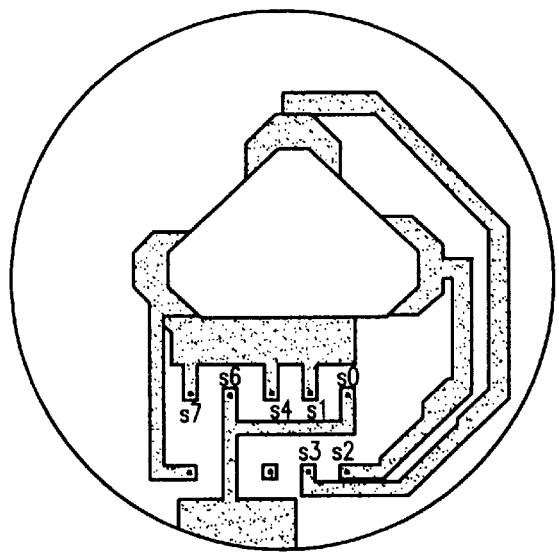
Figure 8C:
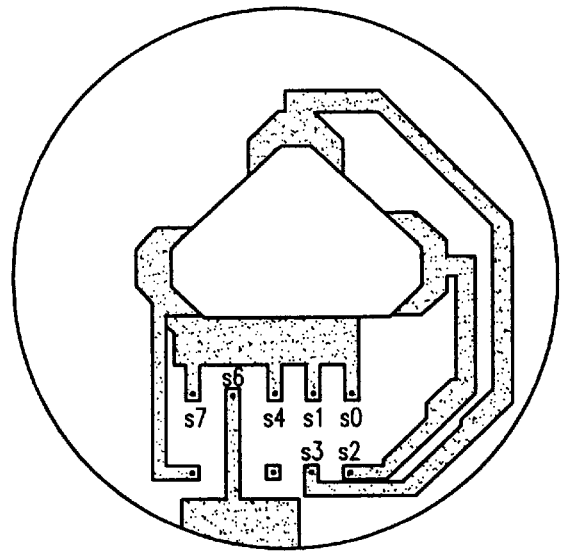

As noted above, the present invention is intended to be used in a flashlight with one or more batteries as its power supply. One of the novel features of the present invention is the use of a printed circuit board to indicate to the control circuit the nature, including size, number and voltage of the batteries which are being used. This is important because the batteries can be of various sizes, and of different voltages. For example, batteries are commonly available in the AAA, AA, C and D sizes. The voltages of the batteries, when used in combination, can vary from 1.5 to 6 volts. Providing the control circuit with a means for identifying the batteries allows a single integrated circuit chip containing the control circuit to be used in conjunction with a plurality of different battery arrangements, thereby saving on manufacturing costs. The circuit board is illustrated in FIG. 8.

The present invention accomplishes this task by assigning specific connections on the circuit board to the inputs of the voltage reference amplifier circuit. These inputs are designated S3, S4, S6 and S7 in FIGS. 1 and 8. The inputs may be attached to either a high ($V_{cc}$) or low (ground) voltage. Specific combinations of the voltage level of the input signals indicates to the voltage reference circuit which batteries are being used. Thus, the configuration of the board allows the same chip to be used regardless of the battery arrangement.

An alternative embodiment of the invention is anticipated which provides a light emitting diode (LED) as an alternative source of illumination. The use of an LED is option. The LED can provide limited illumination when the voltage available to the regular incandescent bulb falls below a minimum threshold. Once the available voltage falls below this threshold, the bulb no longer "turns on." Since an LED is more efficient at supplying illumination for a given voltage, the circuitry will have the option of using an LED to extract the remaining "useful" voltage from the cells. The LED is not illustrated in the drawings. In the alternative embodiment, the LED is connected in place of the light bulb 90 which is illustrated in FIG. 1. The LED may also be connected in parallel to the light bulb, with a mechanical switch to lock out the light bulb while the LED is in use.

In this alternative embodiment, the LED will be available regardless of the remaining voltage and the LED can be used as a source of illumination, at full voltage or below the bulb threshold voltage, at the option of the user. If multiple LED's are used, each LED will receive maximum power in a serial fashion before the next is illuminated. The LED will be able to perform the same functions as the incandescent bulb, that is On, Off, or Flash, but will not dim.

Figure 9:
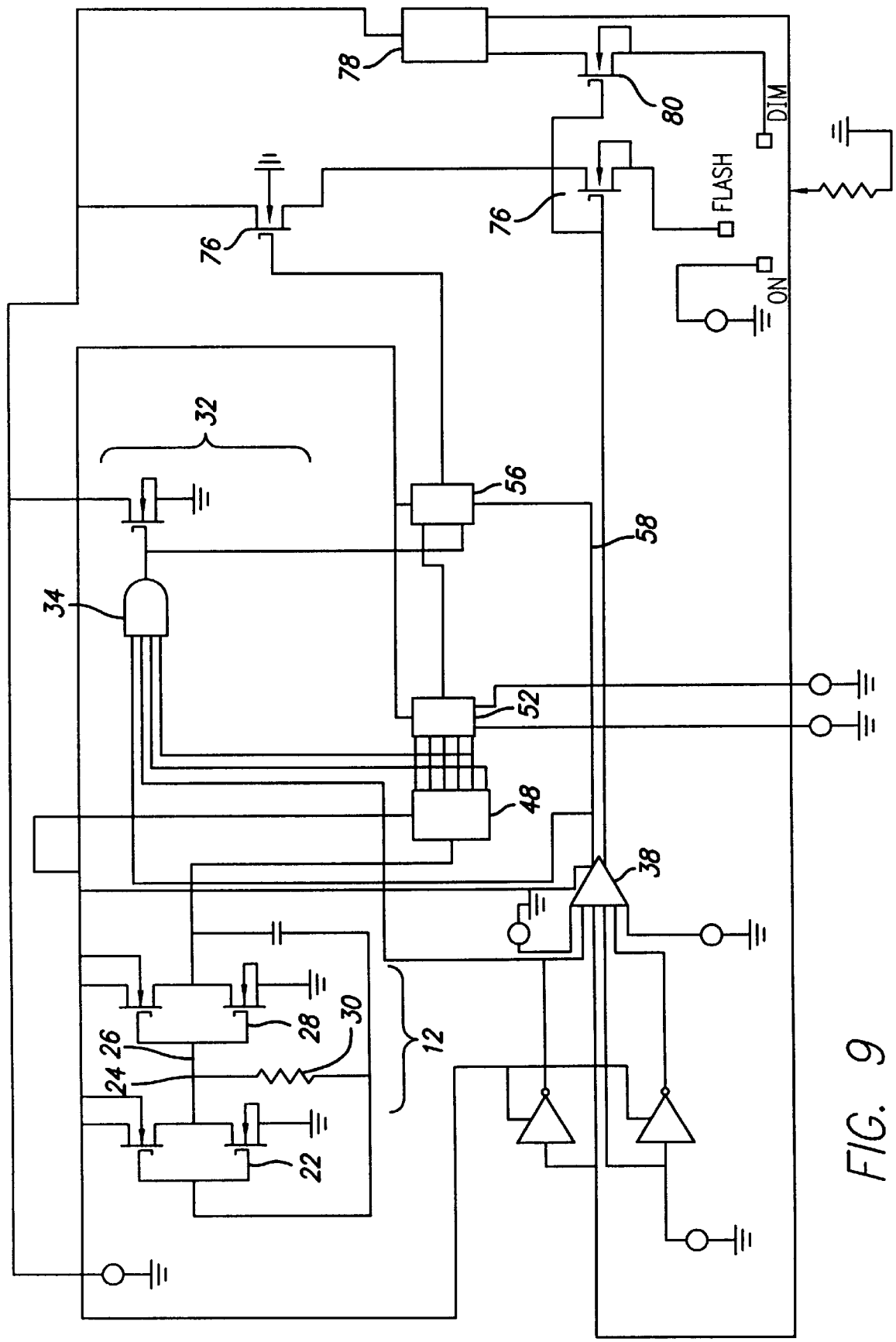
FIG. 9 is a schematic diagram of an alternative embodiment of the overall circuit configuration according to the present invention.

Referring next to FIG. 9, a general schematic diagram of alternative embodiment of the control circuit is illustrated. This alternative circuit is intended to be used at times where physical space limitations are an issue for the design of the flashlight. This might arise, for example in instances where the housing of the flashlight is small and the preferred embodiment of the control circuit will not fit within the housing. Other instances include times when the number and size of the batteries used necessitate the use of a smaller printed circuit board.

The main difference between the preferred embodiment of the control circuit illustrated in FIG. 1 and the alternative embodiment illustrated in FIG. 2 is the omission of the capacitor 37 and the resistor 39. As a result, there is no RC circuit to discharge, and the low battery indicator circuit oscillates continuously. In the preferred embodiment, the light bulb will turn on and off at a rate of 4 Hz to indicate that the battery is low. Hence, the user is constantly made aware of the need to change the battery in the flashlight. The omission of the capacitor 37 and the resistor 39 are to conserve space. In all other substantive aspects, the alternative embodiment of the control circuit functions in a manner which is similar to the functionality of the preferred embodiment.

The basic operational features of the present invention will now be described. The switch 90 may be set to the "on" position illustrated in FIG. 1. The light bulb 100 will then provide steady illumination. In this position, the flash feature and functions of the control circuit are disabled. Also disabled is the dim feature and functions.

The low battery indicator function is active in the "on" mode. The voltage level of the battery will decay through normal usage. When the voltage from the battery reaches substantially 80% of the steady state value, signal S5 goes high, causing S5' to go high for approximately six seconds. While S5' is high, the low battery indicator circuit causes the light bulb to flash. In the preferred embodiment, the light bulb flashes at a rate of 6 Hz.

The capacitor 37 of the low battery indicator circuit discharges through resistor 39. This causes signal S5' to go low. When S5' returns to low, the circuit returns to normal operation.

The switch 90 which is illustrated in FIG. 1 may be set to the "flash" position. In this position, the bulb 100 is connected to the second FET 79 of FET pair 76. The flashing frequency of the light bulb is pre-selected by the circuit board configuration. (See discussion above with respect to FIG. 9). The particular frequency chosen is selected by multiplexer 52 according to the value of input signals S0 and S1. The output of multiplexer 52 is connected to the first FET 74 of FET pair 76. This causes FET 79 to oscillate at the desired frequency, making light bulb 90 flash on and off.

The low battery indicator function is active when the switch is in the "dim" mode. The operation of this feature is identical to that described above with respect to the "on" mode.

The switch 90 which is illustrated in FIG. 1 may be set to the "dim" position. In this position, the bulb 100 is coupled to a parallel FET 80. This parallel FET is scaled to provide approximately one half of the nominal current to the light bulb. It will be apparent to those skilled in the art that a different scaling factor could also be used. The parallel FET 80 performs a similar function for the "dim" mode that the second FET 79 of the FET pair 78 does for the "flash" function. When the "dim" mode is selected, the low battery function is disabled.

A lamp control circuit has been described. The foregoing description has been made with respect to specific embodiments, arrangements and constructions of the lamp control circuit. It will be apparent to those skilled in the art that the foregoing description is intended for illustrative purposes only, and that various changes and modifications can be made to the present invention without departing from the overall spirit and scope of the present invention. The full extent of the present invention is defined and limited only by the following claims.

What is claimed is:

1. A lamp control circuit for use in a flashlight, the flashlight including at least one battery for use as a power supply, a light bulb, and a light emitting diode (LED), the lamp control circuit comprising:

oscillator means coupled to the light bulb and the LED;

voltage indicator means coupled to the battery for indicating to a user when the voltage level of the battery falls below a first pre-determined level;

dimmer means comprising a 2 to 1 multiplexer coupled to voltage regulator means coupled between the battery and a bulb for reducing the amount of electrical current supplied to the light bulb; and activation means coupled between said voltage indicator means and the LED, wherein said activation means supplies electrical power to the LED when a voltage level of the battery has fallen below a second pre-determined level.

2. A lamp control circuit for use in a flashlight, the flashlight including at least one battery for use as a power supply, a light bulb, and a light emitting diode (LED), the lamp control circuit comprising:

oscillator means coupled to the light bulb and the LED, said oscillator means comprising an oscillator coupled to a frequency divider chain, said frequency divider chain comprising a plurality of d-flip flops;

voltage indicator means coupled to the battery for indicating to a user when the voltage level of the battery falls below a first pre-determined level;

dimmer means coupled between the battery and a bulb for reducing the amount of electrical current supplied to the light bulb; and activation means coupled between said voltage indicator means and the LED, wherein said activation means supplies electrical power to the LED when a voltage level of the battery has fallen below a second pre-determined level.

3. A lamp control circuit for use in a flashlight having a power supply and a light bulb, said lamp control circuit comprising:

oscillator means selectively applying power to the light bulb for turning said bulb on and off at one of a plurality of a selectable frequencies;

voltage indicator means coupled to the power supply for indicating to a user when the voltage level of the power supply falls below a pre-determined level; and dimmer means comprising a 2 to 1 multiplexer coupled to voltage regulator means coupled between the light bulb and the power supply for reducing an amount of electrical current supplied to the light bulb.

4. The device of claim 3 wherein said oscillator means comprise an oscillator coupled to a frequency divider chain.

5. The device of claim 4 wherein said frequency divider chain comprises a plurality of d-flip flops.

6. A lamp control circuit for use in a flashlight, the flashlight including at least one battery for use as a power supply, a light bulb, and a light emitting diode (LED), the lamp control circuit comprising:

oscillator means coupled to the light bulb and the LED;

voltage indicator means coupled to the battery for indicating to a user when the voltage level of the battery falls below a first pre-determined level;

dimmer means coupled between the battery and a bulb for reducing the amount of electrical current supplied to the light bulb; and activation means coupled between said voltage indicator means and the LED, wherein said activation means supplies electrical power to the LED when a voltage level of the battery has fallen below a second pre-determined level.

7. The device of claim 6 wherein said voltage indicator means activates said oscillator means, causing the light bulb to turn on and off at a first frequency when the voltage level of the battery has fallen below said first pre-determined level.

8. The device of claim 6 wherein said dimmer means reduces by substantially 50% the amount of current flow to the light bulb.

9. The device of claim 6 wherein said dimmer means comprises a pair of field effect transistors.

10. The device of claim 6 wherein said dimmer means further comprises a switch which is actuable by a user.

11. The device of claim 6 wherein said second pre-determined level is substantially equal to the threshold voltage of the light bulb.

12. The device of claim 6 wherein said oscillator means, voltage indicator means, dimmer means, and said activation means are all included within a single integrated circuit.

13. The device of claim 6 wherein said first pre-determined level is substantially 80% of the steady state value of the battery.

14. The device of claim 13 wherein said first frequency is substantially 6 Hz.

15. The device of claim 6 wherein said oscillator means turns the light bulb and the LED on and off at one of a plurality of selectable frequencies.

16. The device of claim 15 wherein said plurality of selectable frequencies include the values of ½ Hz, 1 Hz, 2 Hz and 4 Hz.

17. A lamp control circuit for use in a flashlight having a power supply and a light bulb, said lamp control circuit comprising:
   oscillator means, including at least one field effect transistor, selectively varying the amount of current supplied to the light bulb for turning said bulb on and off at one of a plurality of a selectable frequencies;
   voltage indicator means coupled to the power supply for indicating to a user when the voltage level of the power supply falls below a pre-determined level; and
   dimmer means coupled between the light bulb and the power supply for reducing an amount of electrical current supplied to the light bulb.

18. The device of claim 17 wherein said dimmer means reduce by substantially 50% the amount of current flow to the light bulb.

19. The device of claim 17 wherein said dimmer means comprise a pair of field effect transistors.

20. The device of claim 17 wherein said dimmer means further include a switch which is actuable by a user.

21. The device of claim 17 wherein said plurality of selectable frequencies include the values of ½ Hz, 1 Hz, 2 Hz and 4 Hz.

22. The device of claim 17 wherein said oscillator means, said voltage indicator means and said dimmer means are all included within a single integrated circuit.

23. The device of claim 17 wherein said voltage indicator means activates said oscillator means, causing the light bulb to turn on and off at a first frequency when said voltage indicator means indicates that the voltage level of the power supply has fallen below a pre-determined level.

24. The device of claim 23 wherein said pre-determined level is substantially 80% of the steady state value of the power supply.

25. The device of claim 23, wherein said first frequency is substantially 6 Hz.

26. The device of claim 17 wherein the flashlight further includes at least one light emitting diode (LED) coupled to the control circuit, and the control circuit further comprises activation means for supplying electrical power to said at least one LED.

27. The device of claim 26 wherein said activation means further include a switch which is actuable by a user.

28. The device of claim 26 wherein said oscillator means, voltage indicator means, dimmer means and activation means are all included within a single integrated circuit.

29. The device of claim 26 wherein said activation means are coupled to said voltage indicator means and wherein said activation means supply electrical power to said at least one LED when the voltage level of the power supply has fallen below a pre-determined level.

30. The device of claim 29 wherein said pre-determined level is substantially equal to the threshold voltage of the light bulb.

31. In a flashlight having a housing, a light bulb and a plurality of batteries for use as a power supply, all mounted within the housing, the improving comprising:
   circuit board means mounted within the housing;
   integrated circuit means mounted on said circuit board means;
   wherein said circuit board means include means for electrically connecting the batteries to said integrated circuit means;
   wherein said circuit board means further include means for indicating the number and voltage of the batteries to said integrated circuit means;
   wherein said integrated circuit means includes a lamp control circuit;
   wherein said lamp control circuit comprises at least the following elements:
   (a) oscillator means for turning the light bulb on and off at a selectable frequency;
   (b) voltage indicator means for indicating to a user when the voltage level of the battery falls below a pre-determined level; and
   (c) dimmer means for reducing the amount of electrical current supplied to the light bulb.

32. In a flashlight having a housing, a light bulb and a battery for use as a power supply mounted within said housing, the improving comprising:
   circuit means mounted within said housing;
   integrated circuit means mounted on said circuit means, said integrated circuit means being coupled to the light bulb and said integrated circuit means including voltage reference amplifier means;
   wherein said circuit means include means for electrically connecting the battery to said integrated circuit means;
   wherein said circuit means further include means for indicating the voltage of the battery to said integrated circuit means;
   wherein said integrated circuit means includes a lamp control circuit;
   wherein said lamp control circuit comprises at least the following elements:
   (a) oscillator means for turning the light bulb on and off at a selectable frequency;
   (b) voltage indicator means for indicating to a user when the voltage level of the battery falls below a pre-determined level; and
   (c) dimmer means for reducing the amount of electrical current supplied to the light bulb.

33. The device of claim 32 wherein said means for indicating comprises an electrical connection between the battery and a pre-determined input of said voltage reference amplifier means.

34. In a flashlight having a housing, a light bulb and a battery for use as a power supply mounted within said housing, the improving comprising:
   circuit means mounted within said housing;
   integrated circuit means mounted on said circuit means, said integrated circuit means being coupled to the light bulb;
   wherein said circuit means include means for electrically connecting the battery to said integrated circuit means;
   wherein said circuit means further include means for indicating the voltage of the battery to said integrated circuit means;

wherein said integrated circuit means includes a lamp control circuit;

wherein said lamp control circuit comprises at least the following elements:
  (a) oscillator means for turning the light bulb on and off at a selectable frequency;
  (b) voltage indicator means for indicating to a user when the voltage level of the battery falls below a pre-determined level; and
  (c) dimmer means for reducing the amount of electrical current supplied to the light bulb.

35. The device of claim 34, wherein said circuit means comprises a printed circuit board.

36. The device of claim 34 wherein said means for electrically connecting comprises printed traces on a circuit board.

* * * * *